US010769069B2

(12) United States Patent
Bondarenko et al.

(10) Patent No.: US 10,769,069 B2
(45) Date of Patent: Sep. 8, 2020

(54) PREFETCHING IN DATA PROCESSING CIRCUITRY

(71) Applicant: Arm Limited, Cambridge (GB)

(72) Inventors: Natalya Bondarenko, Antibes (FR); Lucas Garcia, Antibes (FR); Geoffray Matthieu Lacourba, Nice (FR)

(73) Assignee: Arm Limited, Cambridge (GB)

(*) Notice: Subject to any disclaimer, the term of this patent is extended or adjusted under 35 U.S.C. 154(b) by 273 days.

(21) Appl. No.: 15/910,137

(22) Filed: Mar. 2, 2018

(65) Prior Publication Data

US 2019/0272234 A1   Sep. 5, 2019

(51) Int. Cl.
*G06F 12/00* (2006.01)
*G06F 12/0862* (2016.01)

(52) U.S. Cl.
CPC .. *G06F 12/0862* (2013.01); *G06F 2212/1021* (2013.01); *G06F 2212/1024* (2013.01); *G06F 2212/602* (2013.01)

(58) Field of Classification Search
CPC ......... G06F 12/0862; G06F 2212/1021; G06F 2212/602
See application file for complete search history.

(56) References Cited

U.S. PATENT DOCUMENTS

2014/0201452 A1\* 7/2014 Meredith .............. G06F 12/128
711/130

OTHER PUBLICATIONS

U.S. Appl. No. 15/910,122, filed Mar. 2, 2018, Inventor: Garcia et al.

(Continued)

*Primary Examiner* — Gurtej Bansal
(74) *Attorney, Agent, or Firm* — Nixon & Vanderhye P.C.

(57) ABSTRACT

Data processing circuitry comprises a cache memory to cache a subset of data elements from a main memory; a processing element to execute program code to access data elements having respective memory addresses, the processing element being configured to access the data elements in the cache memory and, in the case of a cache miss, to fetch the data elements from the main memory; prefetch circuitry, responsive to an access to a current data element, to initiate prefetching into the cache memory of a data element at a memory address defined by a current offset value relative to the address of the current data element; offset value selection circuitry comprising: an address table to store memory addresses for which a data element accessed by the processing element resulted in a cache miss or an access to a previously prefetched data element; detector circuitry to detect, for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table; in which the detector circuitry is configured to set a next instance of the current offset value in response to the one or more detected metrics; verification circuitry to detect, at one or more predetermined stages with respect to the processing of the group of candidate offset values by the offset value selection circuitry, one or more verification metrics representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and control circuitry to inhibit prefetching at least until a next selection of a current offset value by the offset value selection circuitry, in response to a detection by the verification circuitry that the one or more verification metrics do not comply with the predetermined condition.

14 Claims, 10 Drawing Sheets

(56) References Cited

OTHER PUBLICATIONS

Pierre Michaud, "Best-Offset Hardware Prefetching", *International Symposium on High-Performance Computer Architecture*, Mar. 2016, 13 pages.

Office Action dated Jan. 30, 2020 for U.S. Appl. No. 15/910,122, 10 pages.

\* cited by examiner

PREFETCHING IN DATA PROCESSING CIRCUITRY

BACKGROUND

This disclosure relates to prefetching in data processing circuitry.

Many examples of data processing circuitry make use of prefetching. For example, where a set of data elements being accessed by a processor is too large to fit into a cache memory such as an on-chip cache, the data elements are prefetched to the cache memory so as to be ready for use by the processor at the appropriate time. In another example, even if the set of data elements can fit in the cache, prefetching can be used to load the required data elements into the cache so that they are ready for use in a cache memory which is potentially quicker for the processor to access. This implies that ahead of the time at which the data element will be required, a prediction has to be made so that the correct data element can be prefetched.

One example technique for determining which data element to prefetch is a so-called offset technique, sometimes referred to as a "best offset" prefetching technique. Examples are disclosed in "Best Offset Hardware Prefetching", Michaud et al, International Symposium on High-Performance Computer Architecture, March 2016, hal-01254863, the contents of which are hereby incorporated by reference. In such techniques, a detection may be made of a frequently occurring offset (in terms of a difference in memory address) between successively accessed data elements. If the latency of fetching is such that a next-required data item might not be fetched in time, and offset equivalent to a multiple of the difference can be used so that, for example, in response to accessing a particular data item, a next-but-one data item in the sequence is initiated for prefetching. In other examples, if there are two or more interleaved patterns of access, either multiple offset can be detected or an offset used which is a multiple of both offsets (or of each such offset). The detected offset is applied as a prefetch offset, so that in response to an access to a data element at a particular address X, the prefetch circuitry will initiate prefetching of [X+(current best offset)].

A processor operating with accurate and timely prefetching will generally provide a higher performance than one without. However, inaccurate or incorrect prefetching can be a net drain on performance, in that it is generally considered better to operate without prefetching than to prefetch the wrong data. This is because incorrect prefetching uses significant memory access resources and can also "pollute" the cache by populating it with incorrect data and possibly evicting correct or useful cached data.

SUMMARY

In an example arrangement there is provided data processing circuitry comprising:

a cache memory to cache a subset of data elements from a main memory;

a processing element to execute program code to access data elements having respective memory addresses, the processing element being configured to access the data elements in the cache memory and, in the case of a cache miss, to fetch the data elements from the main memory;

prefetch circuitry, responsive to an access to a current data element, to initiate prefetching into the cache memory of a data element at a memory address defined by a current offset value relative to the address of the current data element;

offset value selection circuitry comprising:

an address table to store memory addresses for which a data element accessed by the processing element resulted in a cache miss or an access to a previously prefetched data element;

detector circuitry to detect, for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table;

in which the detector circuitry is configured to set a next instance of the current offset value in response to the one or more detected metrics;

verification circuitry to detect, at one or more predetermined stages with respect to the processing of the group of candidate offset values by the offset value selection circuitry, one or more verification metrics representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and control circuitry to inhibit prefetching at least until a next selection of a current offset value by the offset value selection circuitry, in response to a detection by the verification circuitry that the one or more verification metrics do not comply with the predetermined condition.

In an example arrangement there is provided data processing circuitry comprising:

means for caching a subset of data elements from a main memory in a cache memory;

means for executing program code to access data elements having respective memory addresses, comprising accessing the data elements in the cache memory and, in the case of a cache miss, fetching the data elements from the main memory;

means for initiating, in response to an access to a current data element, prefetching into the cache memory of a data element at a memory address defined by a current offset value relative to the address of the current data element;

means for selecting an offset value, the selecting means comprising:

means for storing in an address table memory addresses for which a data element accessed by the processing element resulted in a cache miss or an access to a previously prefetched data element;

means for detecting, for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table;

in which the detecting means comprises setting a next instance of the current offset value in response to the one or more detected metrics;

means for detecting, at one or more predetermined stages with respect to the processing of the group of candidate offset values by the offset value selection circuitry, one or more verification metrics representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and means for inhibiting prefetching at least until a next selection of a current offset value by the offset value selection circuitry, in response to a detection by the verification circuitry that the one or more verification metrics do not comply with the predetermined condition.

In an example arrangement there is provided a method comprising:

caching a subset of data elements from a main memory in a cache memory;

executing program code to access data elements having respective memory addresses, comprising accessing the data elements in the cache memory and, in the case of a cache miss, fetching the data elements from the main memory;

initiating, in response to an access to a current data element, prefetching into the cache memory of a data element at a memory address defined by a current offset value relative to the address of the current data element;

selecting an offset value, the selecting step comprising:

storing in an address table memory addresses for which a data element accessed by the processing element resulted in a cache miss or an access to a previously prefetched data element;

detecting, for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table;

in which the detecting step comprising setting a next instance of the current offset value in response to the one or more detected metrics;

detecting, at one or more predetermined stages with respect to the processing of the group of candidate offset values by the offset value selection circuitry, one or more verification metrics representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and inhibiting prefetching at least until a next selection of a current offset value by the offset value selection circuitry, in response to a detection by the verification circuitry that the one or more verification metrics do not comply with the predetermined condition.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
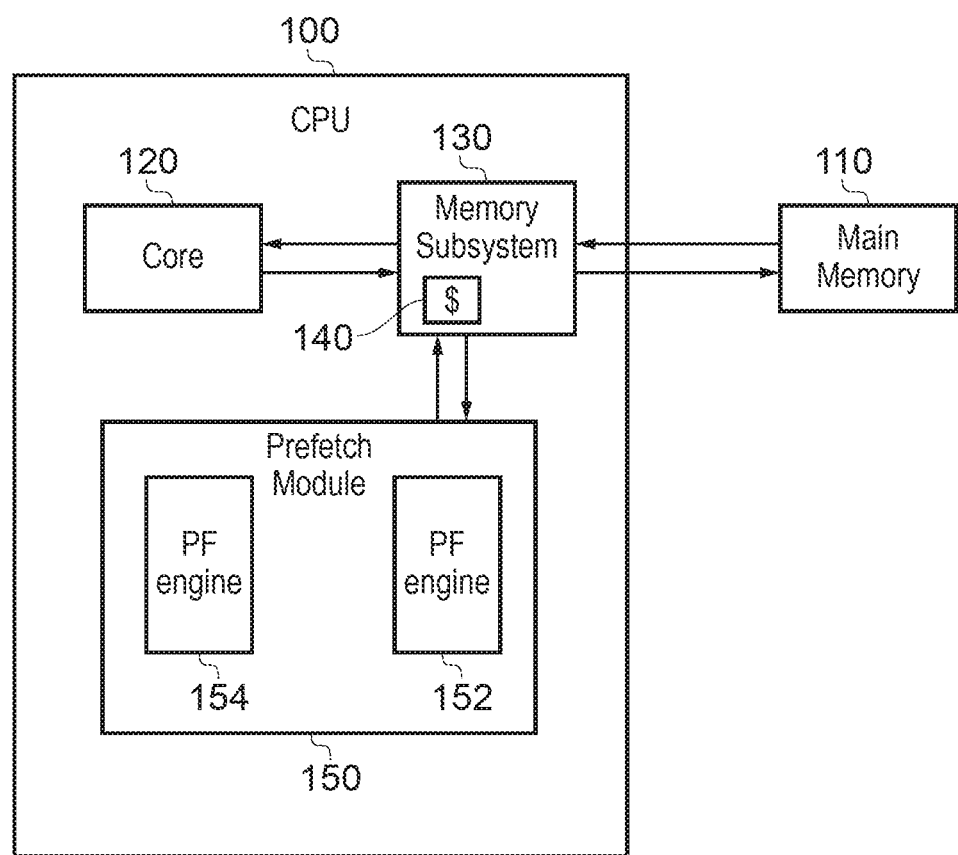
FIG. 1 schematically illustrates a data processing apparatus.

Referring now to the drawings, FIG. 1 schematically illustrates data processing circuitry comprising a central processing unit (CPU) 100 connected to a main memory 110, for example by interconnect circuitry (not shown).

The CPU comprises a processing core 120 and a memory subsystem 130 which is disposed between the processing core 120 and the main memory 110 so as to provide data transfer between the two, the memory subsystem 130 including a cache memory 140 ("$"). In example arrangements the cache memory provides an example of a cache memory to cache a subset of data elements from a main memory, and in examples it is arranged as a plurality of cache lines, and each such data element (to be discussed below) represents a cache line.

The processing core 120 provides an example of a processing element to execute program code to access data elements having respective memory addresses, the processing element being configured to access the data elements in the cache memory and, in the case of a cache miss, to fetch the data elements from the main memory.

A prefetch module 150 controls the prefetching or advanced fetching of data elements such as cache lines into the cache memory 140, so as to be ready in time for processing operations by the processing core 120. A prefetch operation is initiated by a prefetch engine 152, 154 within the prefetch module instructing the memory system 130 by indicating the address of a predicted cache line to which the processing core 120 is expected to require access. Then, if that line is in fact already in the cache memory 140, the memory subsystem 130 does not need to do anything. If that line is not already in the cache memory 140, the memory subsystem can fetch that line from main memory 110 and store it in the cache memory 140, potentially removing or evicting an already-stored line.

The prefetch module therefore provides an example of prefetch circuitry, responsive to an access to a current data element, to initiate prefetching into the cache memory of a data element at a memory address defined by a current offset value relative to the address of the current data element.

Accurate prefetching is a significant aim of data processing circuitry of the type shown in FIG. 1. Accurate and timely prefetching can contribute to significant improvements in the data processing performance of this type of circuitry.

Accurate but late prefetching can provide some potential improvements but if the processing core 120 is stalled waiting for the prefetched data to be present in the cache memory 140, this can have an adverse impact on any potential improvement. So, where possible, the aim is to prefetch data elements sufficiently far in advance of their requirement by the processing core 120 that, even taking into account any latency associated with accessing the main memory 110, the data elements are ready and in place in time for their use by the processing core 120.

On the other hand, inaccurate prefetching can potentially have a significant negative effect on performance, for various reasons. For example, it can use up memory access resources on fruitless memory accesses and it can pollute the cache memory 140 with incorrect data, which in turn can possibly cause the eviction of useful or correct data.

The prefetch module 150 may have more than one prefetch engine 152, 154, but in the examples below, the operations of just one prefetch engine such that the prefetch engine 152 will be described for clarity of the description.

The prefetching techniques to be discussed below are based around so-called offset prefetching. Here, it is observed empirically that in many instances, memory accesses take place at memory addresses separated by a particular offset. For example, the following successive memory accesses are all separated by a difference of 2 (for example, 2 cache lines), where A is an arbitrary starting point:

A

A+2

A+4

A+6

A+8 . . . .

As an example, an offset of 2 might prove to be suitable, in that whenever a particular cache line is accessed, a cache line at that address plus 2 is prefetched. However, this choice of offset assumes that the memory latency is such that the address A+2 will be prefetched and ready in the cache by the time that the processing element has finished handling the data at A. If the latency is longer than this, it may be that an offset of 4 is more appropriate, leading to two streams of access and prefetching:

| Address | Triggered prefetch | Received prefetched line |
|---|---|---|
| A | A + 4 | (nothing yet) |
| A + 2 | A + 6 | A + 4 (will be accessed soon) |
| A + 4 | A + 8 | A + 6 (will be accessed soon) |
| . . . | . . . | . . . |

So the detection by the prefetch engine 152 of an appropriate offset (which will be referred to using the term in the art "best offset" below, not implying that it is the absolute best in every respect but just that it has been selected as a result of the limiting testing and evaluation performed by a hardware prefetching system) can take into account this latency issue in selecting the best offset in a particular set of circumstances. The best offset is applied to the currently accessed address to generate a prefetch address for prefetching. Note that offsets can be negative or positive, but that zero is not considered a useful offset.

Another simplified example involves a set of memory accesses with a difference between successive accesses of 2, and another set of memory accesses with a difference between successive accesses of 3.

| A | B |
|---|---|
| A + 2 | B + 3 |
| A + 4 | B + 6 |
| A + 6 | B + 9 |
| . . . | . . . |

Note that the streams can be interleaved so that a set of data items accessed might have addressees such as A, B, A+2, B+3, A+4 . . . .

Here, a best offset of 6 might be selected by the prefetch engine 152. This will then provide for multiple streams of access and prefetch encompassing all of the required addresses:

| Address | Triggered prefetch | Received prefetched line |
|---|---|---|
| A | A + 6 | (nothing yet) |
| B | B + 6 | (nothing yet) |
| A + 2 | A + 8 | A + 6 (will be accessed soon) |
| B + 3 | B + 9 | B + 6 (will be accessed soon) |
| A + 4 | A + 10 | A + 8 (will be accessed soon) |
| B + 6 | B + 12 | B + 9 (will be accessed soon) |
| . . . | . . . | . . . | and so on.

In the examples to be described below, a best offset is derived from data indicating actual instances of cache misses (failures to find a required line in the cache) or cache hits to previously prefetched lines. Multiple candidate offsets are tested multiple times and a best offset selected from the results of that testing.

Figure 2:
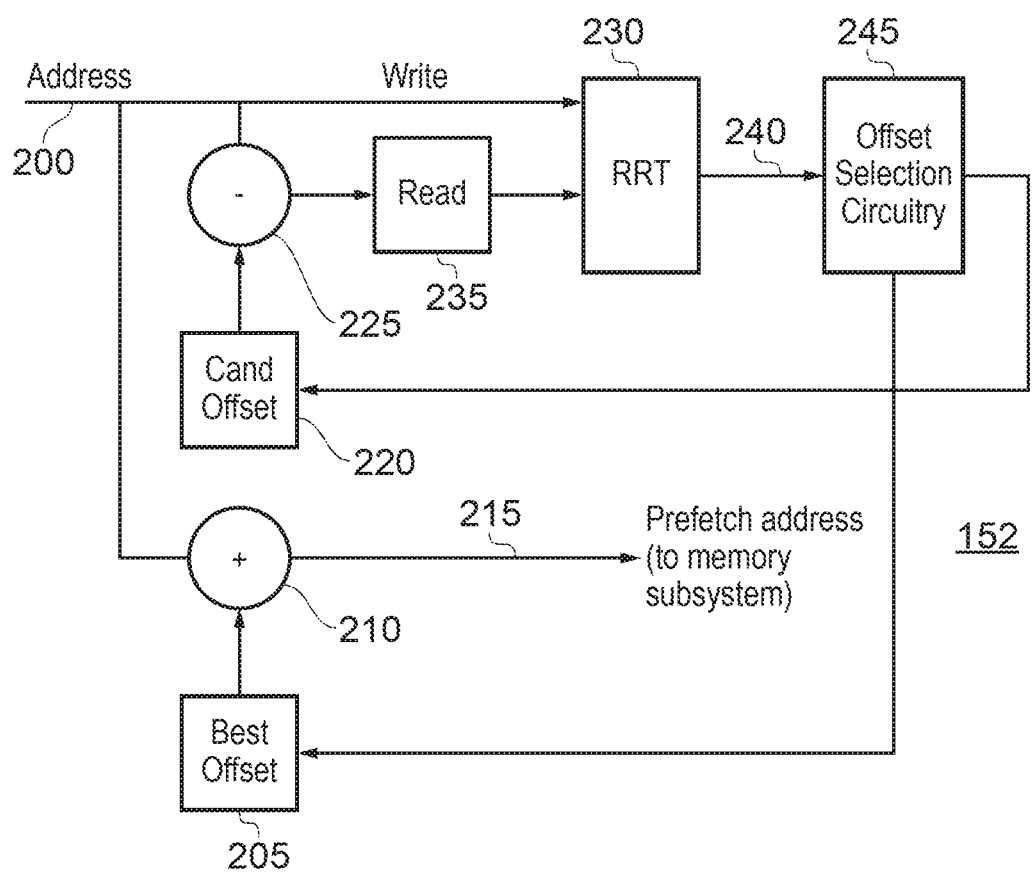
FIG. 2 schematically illustrates the operation of a prefetch engine.

FIG. 2 is a schematic representation of a prefetch engine such as the prefetch engine 152.

As an input, the prefetch engine 152 receives from the memory subsystem 130 an address 200 representing an address for which there was a cache miss, which is to say the required data simply was not present in the cache 140, or for which an access was made by the processing core 120 to a previously prefetched data element such as a previously prefetched cache line. Note that prefetched cache lines may be flagged or marked in the cache memory 140 by an indicator bit or bits so that the memory subsystem 130 can detect when an access is made by the processing core 120 to a previously prefetched cache line. So, in either of those circumstances the memory address relating to that access is provided as the address 200 to the prefetch engine 152.

A current best offset value 205 is maintained by the prefetch engine 152. This is the current instance of an offset value derived for the prevailing operation of the processing core 120. The best offset value is added by an adder 210 to the access address 200 to form the next prefetch address 215. This address is provided to the memory subsystem 130 for use as discussed above.

In order to obtain the best offset value, the prefetch engine 152 performs an ongoing training process. This involves testing candidate offset values, for example in a range from:

$-(2^n-1)$ up to $+2^n$ where n is for example 6 so that the range may be represented as −63 . . . +64 in decimal. A value of zero is not used as a candidate offset because it would represent no offset at all. This therefore provides an example in which the group of candidate offset values comprises integer non-zero offset values between $-(2^n-1)$ and $2^n$ where n is an integer. For example as mentioned above n may equal 6.

The address 200 is written into an address table 230 referred to as a "recent request table" (RRT). This can be, for example, a first-in-first-out (FIFO) memory so that as each address 200 is written into the RRT 230, an oldest address held in the RRT is evicted. The RRT could hold, for example, the most recent 32 addresses 200.

For a current candidate offset under test, the candidate offset is subtracted by a subtractor 225 from the address 200. This value, (address 200 minus candidate offset), is an indication of where a previous prefetched access should have been if the current candidate offset is a correct offset for the current system and the current program code. To test whether that is the case, the candidate offset, as subtracted from the address 200, is provided to read circuitry 235, which detects whether the address minus the candidate offset is present as an address in the RRT 230. If so (if there is a hit in the RRT 230), then this indicates that the candidate offset 220 currently under test could be a useful offset for future prefetching, since it would in fact have worked as an offset to prefetch the currently required data element.

Using techniques to be discussed below, the output of this read operation, namely a hit/miss signal 240 relating to presence or absence in the RRT 230 is provided to offset selection circuitry 245. The offset selection circuitry 225 controls the choice of the prevailing candidate offset 220 and also, at intervals, the selection of the best offset 205.

Figure 3:
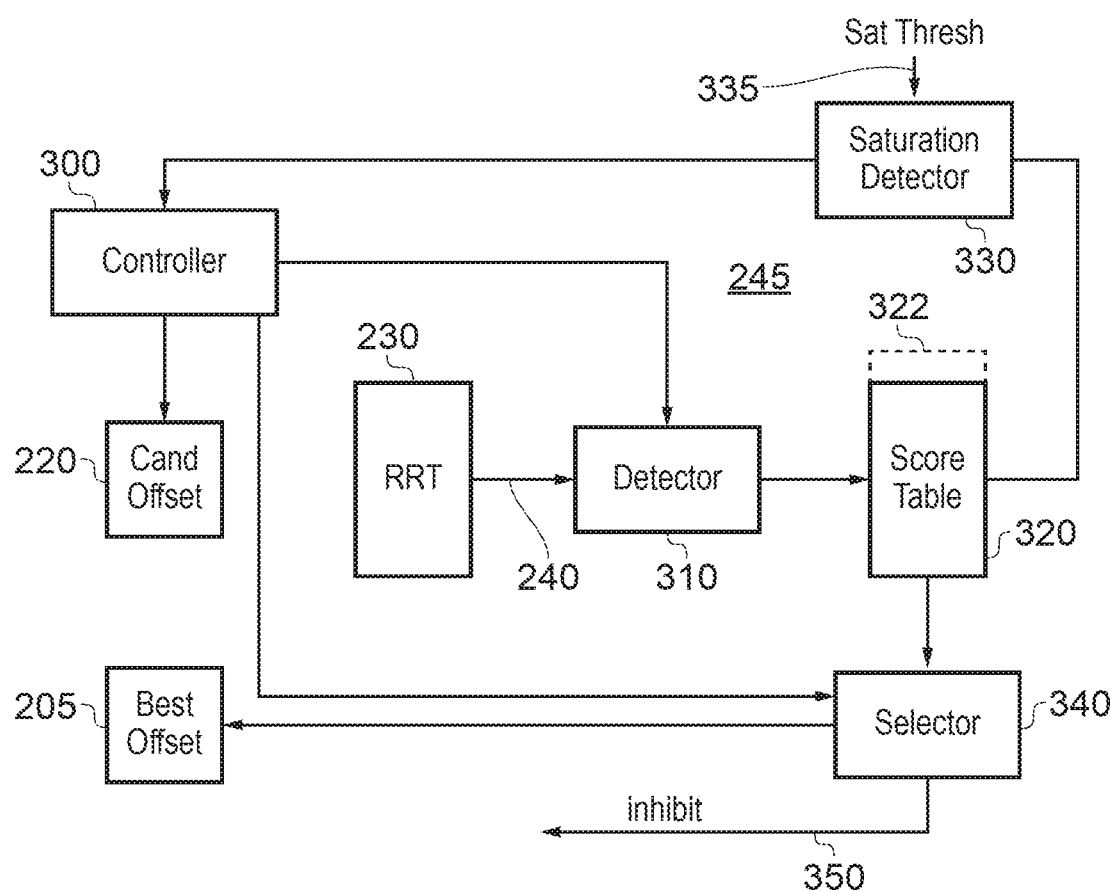
FIG. 3 schematically illustrates an offset selection technique.

FIG. 3 schematically illustrates the operation of the offset selection circuitry 245, and, as part of its operation, selecting of the candidate offset 220 and the best offset 205.

Candidate offsets are tested in so-called phases or sub-phases. These terms, and the differences between them, will be explained in more detail below. A phase or sub-phase represents a group of candidate offset values being tested, such that at the end of the phase or sub-phase, a selection can be made as between the candidate offset values which have been tested during that phase or sub-phase.

With reference to a current phase or sub-phase, a controller 300 selects the candidate offset 220 to be tested. As discussed above, this is provided to the subtractor 225 where it is subtracted from the address 200 and used by read circuitry 235 to access the RRT 230 resulting in a hit/miss signal 240. A detector 310 detects the hit/miss status and also the number of addresses 200 against which the candidate offsets have been tested (a number of "rounds" which will be described below) and at the end of testing of that candidate offset value writes data indicative of these to a score table 320. A saturation detector 330 detects a saturation condition, mainly whether the number of hits has already reached a saturation threshold 335. If it has, then the current phase or sub-phase, representing a series of tests applicable to the group of candidate offset values, is terminated by the controller 300 and a best offset value 205 is selected based on the results in the score table 320. The metrics for the best offset (score, rounds) are overwritten by the values just obtained.

To perform the selection of the best offset value 205, a selector 340 chooses from the score table 320 a candidate offset for which the number of hits exceeds a minimum threshold, and, subject to that condition, for which the number of hits is greatest, and if two or more candidate offsets have the same number of hits (for example equal to the saturation threshold 335), then the one which achieved this number of hits in the smaller number of rounds is selected. The serial testing of candidate offsets avoids a tie situation. The winning offset value is set as the best offset 205 for use in subsequent prefetching.

If, in the current phase or sub-phase, no candidate offset under test meets the minimum threshold, then an inhibit signal 350 is generated by the selector 340 to inhibit prefetching until a next instance of a best offset value is in fact selected. (Note that in a sub-phase system to be described below, the current best offset (if there is one) is also considered and so will be carried forward if no other offset is better). The inhibit signal can, for example, gate the signal 215 being provided to the memory subsystem 130 or it can be provided to the memory subsystem 130 to inhibit any prefetching operation by the memory subsystem 130.

FIG. 3 therefore provides an example of offset value selection circuitry such as the circuitry 245 comprising:

an address table 230 to store memory addresses for which a data element accessed by the processing element resulted in a cache miss or an access to a previously prefetched data element; and detector circuitry 310, 322, 340 to detect, for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table. The detector circuitry is configured to set a next instance 205 of the current offset value in response to the one or more detected metrics.

The difference between a phase and a sub-phase will be described with reference to FIGS. 4 and 5.

In brief, in a "phase", the whole cohort of candidate offsets (for example, −63 to +64 excluding zero in this example) is tested and a best offset is selected from amongst the whole cohort at the end of that testing. The metrics for the best offset (score, rounds) are overwritten by the values just obtained.

In contrast, in a sub-phase, a subset of the candidate offsets is tested, for example, a subset of four candidate offsets. These are evaluated (by their metrics such as their score and rounds metrics) not only against one another but also against the metrics most recently obtained for the prevailing best offset. So, in many instances it might be that the current best offset continues to be the most appropriate offset and emerges as the winning offset from the tests applied in the sub-phase, but the sub-phase provides a temporally short opportunity for another offset to become the best offset.

Figure 4:
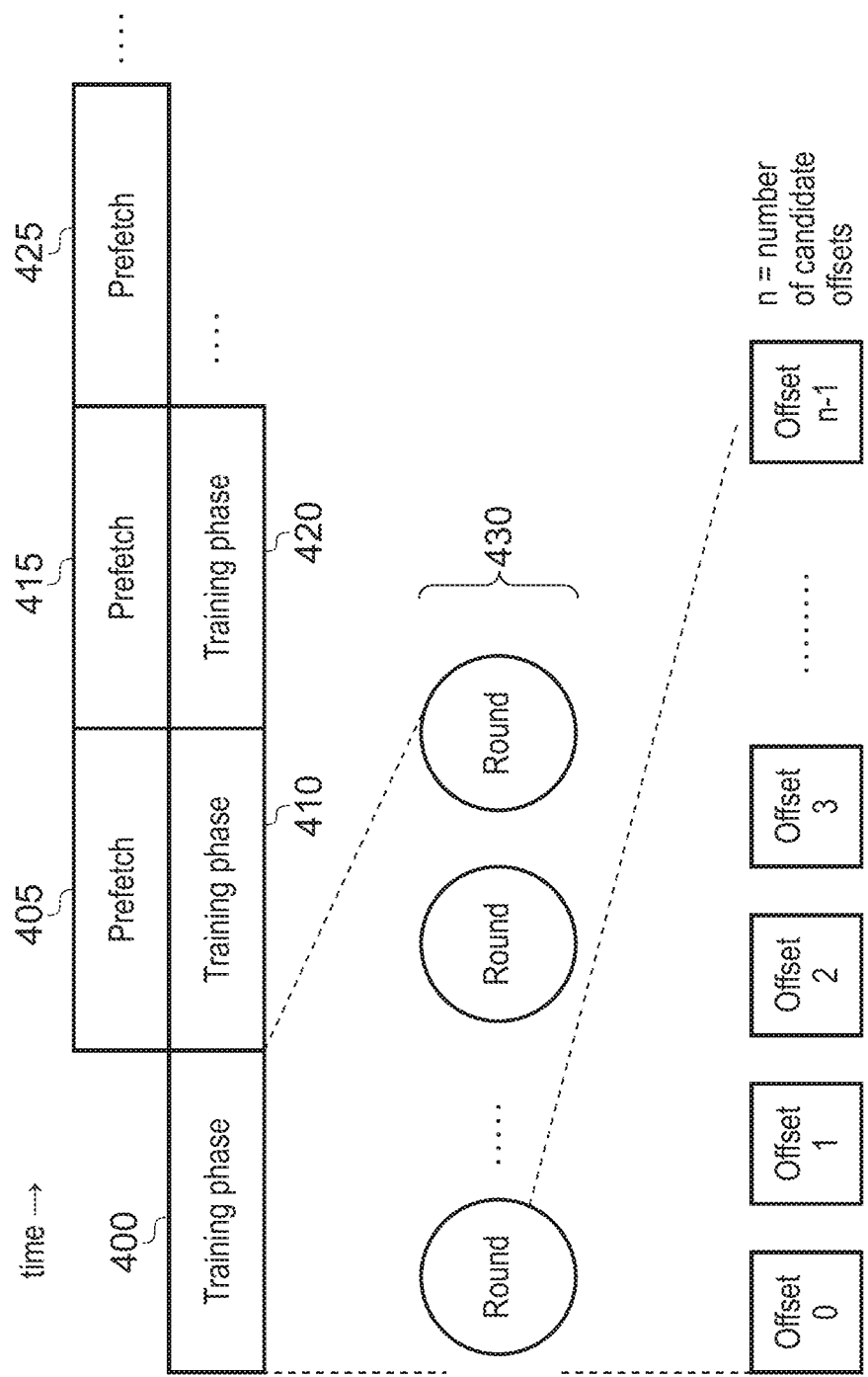
FIGS. 4 and 5 schematically illustrate offset selection by phase and sub-phase respectively.

FIG. 4 schematically illustrates the nature of the training phases discussed above. Time is represented from left to right in a horizontal direction relative to the drawing.

A first training phase 400 is performed leading to the selection of a best offset value which is then used for prefetching during a prefetching period 405 while a next training phase 410 is taking place. The best offset value obtained by the training phase 410 is used for prefetching during a period 415 while a third training phase 420 is taking place leading to the generation of a best offset value for use during a prefetching period 425 and so on.

Each training phase performs the testing discussed above in respect of all the candidate offsets, such as the set of candidate offsets from −63 . . . +64, excluding zero (127 offsets altogether). A training phase comprises a succession of so-called rounds 430. Each round involves performing the test discussed above for each candidate offset in turn, so testing against 127 addresses in this example. A first candidate offset (such as −63) is tested, then a next candidate offset (such as −62) and so on up to a test of the candidate offset +64. Of course the candidate offsets do not have to be tested in a strict numerical order, or an increasing order from negative to positive, but it will be appreciated that this is just an example of how the testing could be performed. The use of a group of candidate offset values comprising one or more positive candidate offset values and one or more negative offset values allows different examples of program code and processing functions (such as an order of decoding) to be tested using these techniques.

Once one round is complete, another round is performed, up to a maximum number of rounds (such as 100). The expression "up to a maximum number" refers to the feature that if the score (number of hits recorded in the RRT) for any particular offset saturates at the saturation threshold (such as 32 in this example), then the process terminates with that round and the phase terminates. So, the minimum number of rounds is 32 (the saturation threshold) and the maximum is 100 in this example.

Optionally, a variation can be applied, involving storing an additional flag (such as a one bit flag) for each RRT entry. This flag is set to indicate whether the prefetched line triggered by the address stored in this entry has already been loaded to the cache. If this flag is set, then any hit on this entry increases the score for 2 points instead of the value of 1 for other entries as discussed above. This arrangement reflects the fact that the trained offset which triggers the hit on this entry will be timely (not too early, not too late). In this alternative example implementation, the minimum number of rounds is in fact 16.

Potentially, then, the training phases illustrated by FIG. 4 can be relatively long, so that in the example of 127 candidate offsets and a maximum number of rounds of 100 rounds, the total number of memory accesses concerned could be over 12000. At a minimum, the phase will be 32 rounds (the saturation threshold) or 16 rounds (in the optional variation mentioned above) long, which can still mean testing over at least a set of 3200 accesses.

This potentially large phase length can mean that initial training can be quite slow, but also if there is a change in program flow such that the previously derived best offset value is no longer valid, the incorrect best offset value can continue to be used for a relatively long prefetching period 405, 415, 425 until the end of the training phase coinciding with that prefetching period. As discussed above, it is desirable to avoid inaccurate prefetching for the various reasons given above.

Figure 5:
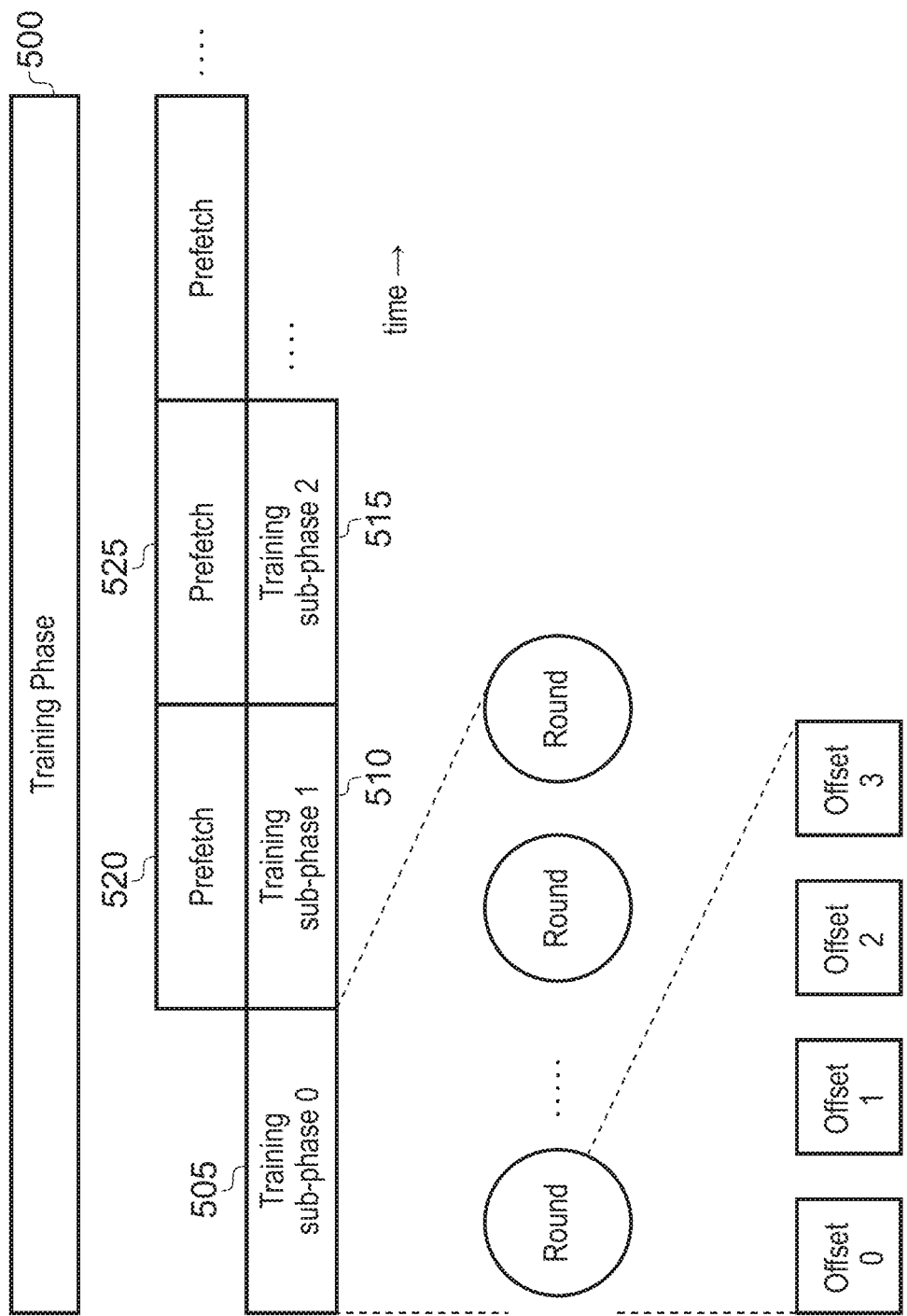

FIG. 5 schematically illustrates example techniques which can at least alleviate this issue, based upon the use of so-called sub-phases.

Here, a training phase 500 during which all of the candidate offset values are tested, is divided into multiple sub-phases 505, 510, 515 . . . . In each sub-phase, a subset of the full group of candidate offset values is tested using much the same techniques as discussed above, but also in comparison with the score and rounds metrics (which may be stored in a separate portion 322 of the score table 320) relating to the current best offset value 205. In example arrangements, the training sub-phases each handle a complimentary subset of the full set of candidate offsets so that in the course of a full training phase 500, a number of sub-phases take place so that each candidate offset is tested once. However, in other examples, at least some of the candidate offsets could be tested more than once over the course of the set of sub-phases.

In the example shown, a sub-phase relates to the testing of four candidate offsets. For example, the four offsets tested may be defined as follows:

64=max positive offset
k=sub-phase index;
m=offset index in an offset list in case of 4 offsets per sub-phase there will be 4 indices: 0, 1, 2, 3;
Offset 0=−(k+1)
Offset 1=k+1
Offset 2=64−k
Offset 3=−(64−k)

For example, the offsets list per sub-phase can include:

Sub-phase 0: 1, −1, 64, (offset −64 is inhibited as it falls outside the range of offsets tested, so this sub-phase is using only 3 offset indexes from 0 up to 2)
Sub-phase 1: 2, −2, 63, −63
. . .
Sub-phase 31: −32, 32, 33, −33

Also, it has been chosen to have a mixture of relatively small magnitude and relatively large magnitude offsets in at least the earlier sub-phases in order to aim to converge to the appropriate best offset faster.

The use of this example pattern (in which sub-groups of candidate offsets each comprise two or more candidate offset values, and/or in which the candidate offset values in a sub-group are selected so that no pair of candidate offset values is related by a positive integer multiple) has at least two potential benefits. A first benefit is that the offsets for testing in a particular sub-phase can be derived as a function of the sub-phase number k, rather than requiring a look-up table or the like, which can be useful in a hardware implementation (where a single counter to generate k and computational circuitry to derive the four offsets are potentially cheaper, in terms of circuit area, than a look-up table). A second potential benefit is that this grouping is such that no offset under test in a sub-phase is a positive multiple of any other offset under test in that sub-phase. This avoids a conflict of results. Consider the schematic examples given above, such as

A
A+2
A+4
A+6
A+8 . . . .

Here, aside from any potential latency issues as discussed above, the system might detect the multiples +2, +4, +8 and so on as potentially useful offsets. It is appropriate therefore not to test such multiples in the same sub-phase.

An example sub-group as discussed above has a pair of positive offset values which differ by one; and a pair of negative offset values which differ by one.

However, the number m of offsets to be tested in a sub-phase could be different from 4, as this is just one example.

Indeed, the total number of candidate offsets in the present examples, ranging from −63 to +64 but excluding zero, is 127.

The four offsets under test in the sub-phase are tested one after the other in a single round. Successive rounds continue up to a maximum in this example of 100 rounds. The sub-phase terminates early if any one of the scores for the candidate offsets under test saturates, for example at the saturation level of 32.

At the end of the sub-phase 505, a best offset value is selected, which could be one of the four candidate offsets tested in that sub-phase or the (previous instance of the) current best offset value, assuming that at least one of those exceeds the minimum score threshold (such as 20).

The selected best offset is used for prefetching during a prefetching period 520 coincident with the next sub-phase training period 510. The winning candidate offset which becomes the best offset as a result of the sub-phase 510 (which again could be the ongoing best offset value if that wins against the four new candidates), is used for prefetching in a period 525 and so on.

The relatively short length of a sub-phase (from 4*32 addresses tested up to 4*100 addresses tested) can bring advantages in terms of a quicker response to changes in program flow or activity. In the example of 127 candidate offsets and a sub-phase in which four candidate offsets are tested, this will reduce the length of time between testing a new winning candidate offset and implementing that candidate offset as the new best offset in a prefetching period by up to a factor of about 32 (roughly 127/4).

Therefore, in these examples relating to the use of sub-phases to be discussed below, the detector circuitry is configured to process the group of candidate offset values as successive complementary sub-groups of one or more of the group of candidate offset values and to set a next instance of the current offset value in response to processing each sub-group, in dependence upon the proportions indicated by the one or more detected metrics for that sub-group; and the one or more metrics previously detected for the current offset value.

Figure 6:
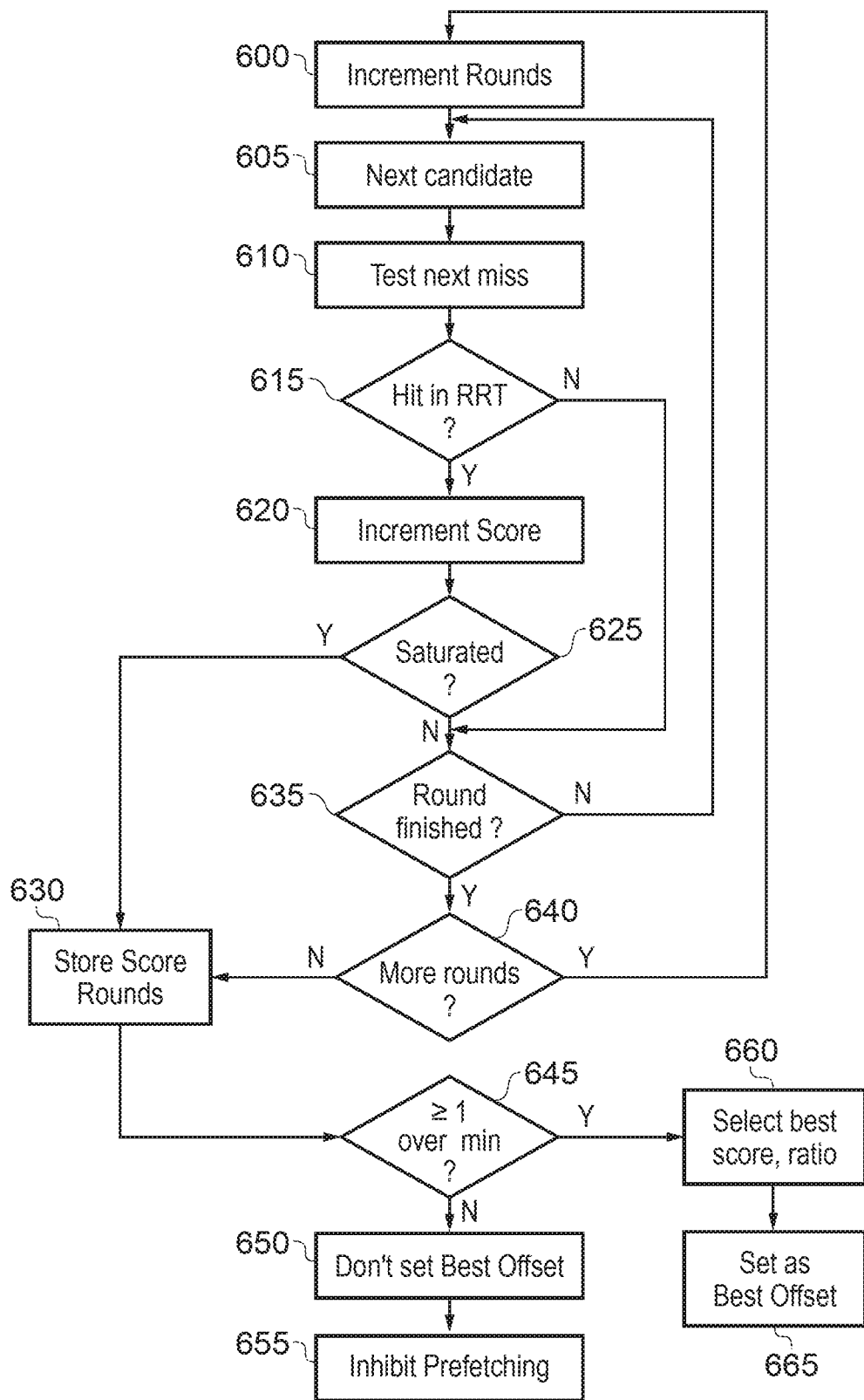
FIG. 6 is a schematic flowchart illustrating a method.

The testing process discussed above will now be described in more detail with reference to a flow chart of FIG. 6 which schematically represents the process. As mentioned above, a number of rounds (up to 100 for example) are performed. In each round, the group or sub-group of candidate offsets are tested one by one. The process is terminated if any score saturates (for example at 32).

In detail, at a step 600, a variable "rounds" (having been initiated to zero) is incremented.

At a step 605 a next candidate offset of those being tested by the current phase or sub-phase is selected. At a step 610 the next cache miss or access to a previously prefetched cache line is tested for that candidate offset using the techniques discussed above.

If, at a step 615 there is a hit for the (address minus candidate offset) in the RRT then the score variable for that candidate offset is incremented at a step 620, for example in the score table 320. From the step 620, control passes to a step 625 at which the score variable is tested to detect whether it has reached the saturation threshold 335. If the answer is yes then the phase or sub-phase terminates.

At a step 630, if they have not already been stored to the score table as part of the processing, both the score and rounds variables are stored in the score table 322. If (in a sub-phase system) the current best offset is one of the candidate offsets under test (which will happen for at least one sub-phase, or exactly one sub-phase if each candidate offset is tested only once in the process) the metrics for the best offset are overwritten by those detected during testing of that offset as a candidate offset, so that the one or more metrics previously detected for a current offset value comprise the one or more metrics most recently detected for the current offset value.

Therefore, in these examples, the one or more respective metrics for a candidate offset comprise:

(i) a score metric indicating a number of data element accesses which resulted in a cache miss or an access to a previously prefetched data element, for which the memory address for that data element access differs by the candidate offset value from a memory address in the address table; and (ii) a rounds metric indicating a number of data element accesses in the set of data element accesses.

Returning to the step 625, if the score is not saturated, or if at the step 615 the (address minus candidate offset) was not a hit in the RRT then control passes to a step 635 at which a detection is made as to whether the round has finished, for example by the round having tested all of the relevant candidate offsets (4 for a sub-phase or 127 for a phase). If the answer is no (which is to say, there remains at least one candidate offset to be tested in this phase or sub-phase) then control returns to the step 605 but if the answer is yes then control passes again to a step 640.

The steps 625, 635 provide an example in which the detector circuitry is configured to detect the score metric for a candidate offset value in respect of successive data element accesses in the set of data element accesses until the score metric reaches a saturation threshold quantity (such as 32) or the rounds metric reaches a threshold size (such as 100). Therefore, in examples the set of data element accesses (rounds) used in testing comprises no more than a predetermined number of data element accesses, greater than one.

If at the step 640 the phase or sub-phase has not finished (there are more rounds to be processed) then control returns to the step 600. On the other hand, if the phase or sub-phase has finished then control passes to the step 630 discussed above.

From the step 630, control passes to a step 645 at which a detection is made as to whether at least one of the scores is over the minimum threshold (such as 20).

In the case of a full phase, the scores under consideration are all of the scores for all of the candidate offsets. In the case of sub-phase, the scores under consideration are the scores for the number (such as 4) of candidate offsets tested in the sub-phase, along with the most recent score achieved for the current best offset value. Assuming in this case that there is indeed a current valid best offset value, it is assumed that its score will be over the threshold. If, at the step 645, the answer is no the control passes to a step 650 at which a best offset is not set and, at a step 655 prefetching is inhibited using the signal 350. In other words, control circuitry 340 is arranged to inhibit prefetching in response to the offset value selection circuitry not setting a next instance of the current offset value, until at least a next selection of a next instance of the current offset value by the offset value selection circuitry.

On the other hand, if at least one of the candidate offsets under consideration (with the prevailing best offset if this is a sub-phase) is over the minimum threshold then at a step 660 the selector 340 selects the best score, or if two scores match, the best ratio of score to rounds and sets that candidate offset as the current best offset at a step 665.

At the step 660, in the case of processing by sub-phase, the detector circuitry 310, 320, 340 is configured to set a next instance of the current offset value according to which of:

(i) the one or more detected metrics for that sub-group; and (ii) the one or more metrics as previously detected for the current offset value indicate a greatest proportion.

In example arrangements, at the step 645 the detector circuitry is configured to apply a minimum threshold proportion (such as a score of 20 which would be achieved by a rounds variable of 100, since saturation would not have taken place) so as to set, as a next instance of the current offset value, a candidate offset value only when the one or more detected metrics for that candidate offset value indicate at least the minimum threshold proportion of the data element accesses.

In other examples, the decision to select a best offset can be made by first selecting the best score and rounds metrics amongst the candidate offsets under test (the four plus the previous best offset in an example sub-phase, or all of them in a full phase). That offset's score is then compared to the minimum threshold. If it exceeds the minimum threshold, then the offset is accepted as a new best offset. Otherwise, prefetching is inhibited. This corresponds to performing the step 660 before the step 645, and deleting the step 650. This arrangement means that a current "best offset" always exists, even if prefetching is currently inhibited.

Figure 7A:
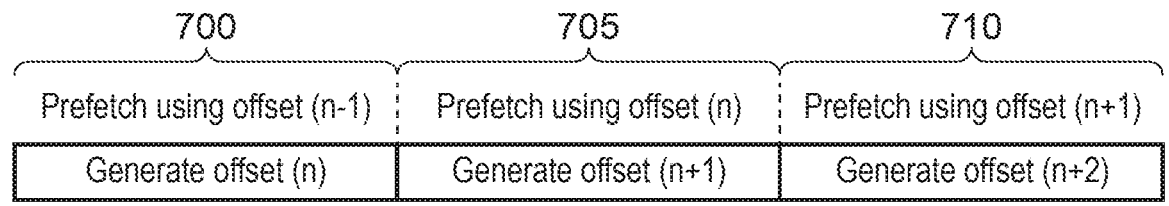
FIGS. 7a to 7c schematically illustrate the use of a verification process.
Figure 7B:
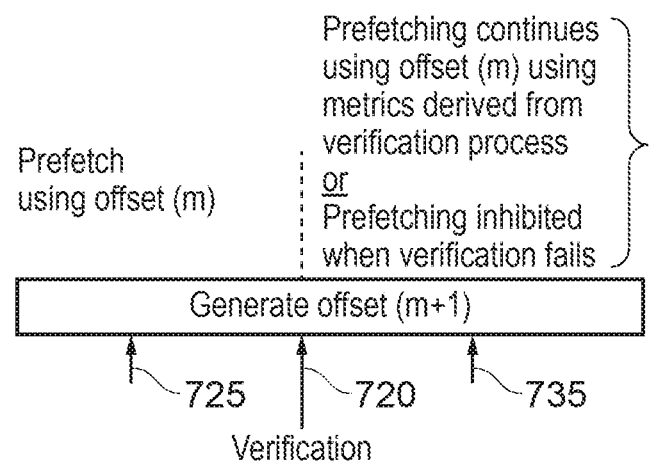
Figure 7C:
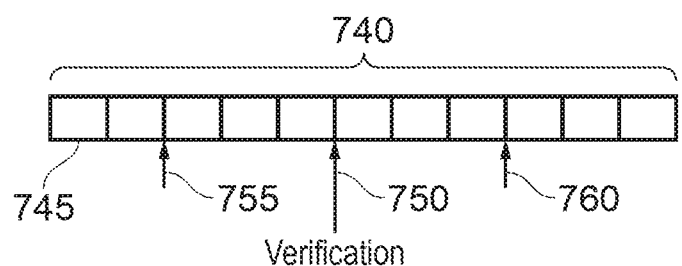

FIGS. 7a to 7c schematically illustrates a verification process. FIGS. 7a and 7b relate to the derivation of a best offset by phase-based testing.

Referring to FIG. 7a, in a similar manner to FIG. 4 discussed above, during a period 700, a particular best offset value offset (n) is generated by a phase of offset testing and during this same period, prefetching is carried out using the previously generated offset, offset (n−1). During a period 705, an offset (n+1) is generated by a phase of testing and prefetching is carried out using offset (n). During a period 710, offset (n+2) is generated by a phase of testing and prefetching is carried out using offset (n+1).

As discussed above, the potentially large number of candidate offsets to be tested and the requirements for statistical significance of the test results mean that the periods 700, 705, 710 can be 12000 data accesses or more in length.

If the program flow changes during one of the those relatively long periods it would be possible for the current best offset value to become out of date and useless (or indeed positively disadvantageous as discussed above), but the previously proposed arrangements would not allow for that best offset value to be updated until the end of a current phase or period 700, 705, 710.

To address this issue, a verification process can be performed at one or more predetermined positions with respect to a phase, such as a position 720, or the position 720 plus position 725, 735. The phase can be paused for the verification process to take place.

The verification process will be discussed below in more detail and applies to the current best offset value, which is to say the one currently being used for prefetching.

In the example of a single verification process at the position 720, taking place during a phase to generate an offset (m+1), the process proceeds as follows. Up to the end of the verification process, prefetching takes place using the previously generated best offset, offset (m). The verification process takes place and the result of the verification process can be that the verification is passed or failed. If the verification is passed, which is to say the use of the current best offset value is verified, then prefetching continues using the same best offset value, offset (m). The metrics for the best offset (score, rounds) are overwritten by the values just obtained. On the other hand, if the verification process relating to the offset (m) fails, then prefetching is inhibited until a next instance of a current best offset is established by the prefetch engine 152.

FIG. 7c schematically illustrates the use of this process in a sub-phase system, such that a period 740 represents a complete set of sub-phases (in which, between the sets of sub-phases, all of the candidate offsets are tested). As part of the sub-phase system, the best offset is established by successive sub-phases 745, each providing a best offset value for use during the period of the next following sub-phase. The best offset generated by the sub-phase is selected from the sub-group of candidate offsets under the current test and the prevailing best offset value.

Again, in FIG. 7c verification can be performed at one or more positions such as a position 750 or other positions 755, 760 with respect to the set of sub-phases, for example in a gap between adjacent sub-phases. The verification is applied to the prevailing best offset value as selected by the immediately preceding sub-phase. If the best offset value passes the verification it continues to be used as normal, though the metrics for the best offset (score, rounds) are overwritten by the values just obtained in the verification process. If it fails the verification the prefetching is inhibited until a next instance of a best offset value is selected as a result of one of the sub-phases. (Note that as discussed above, in order to select a next instance of a best offset value, a candidate offset must achieve at least the minimum threshold of hits in the RRT).

Figure 8:
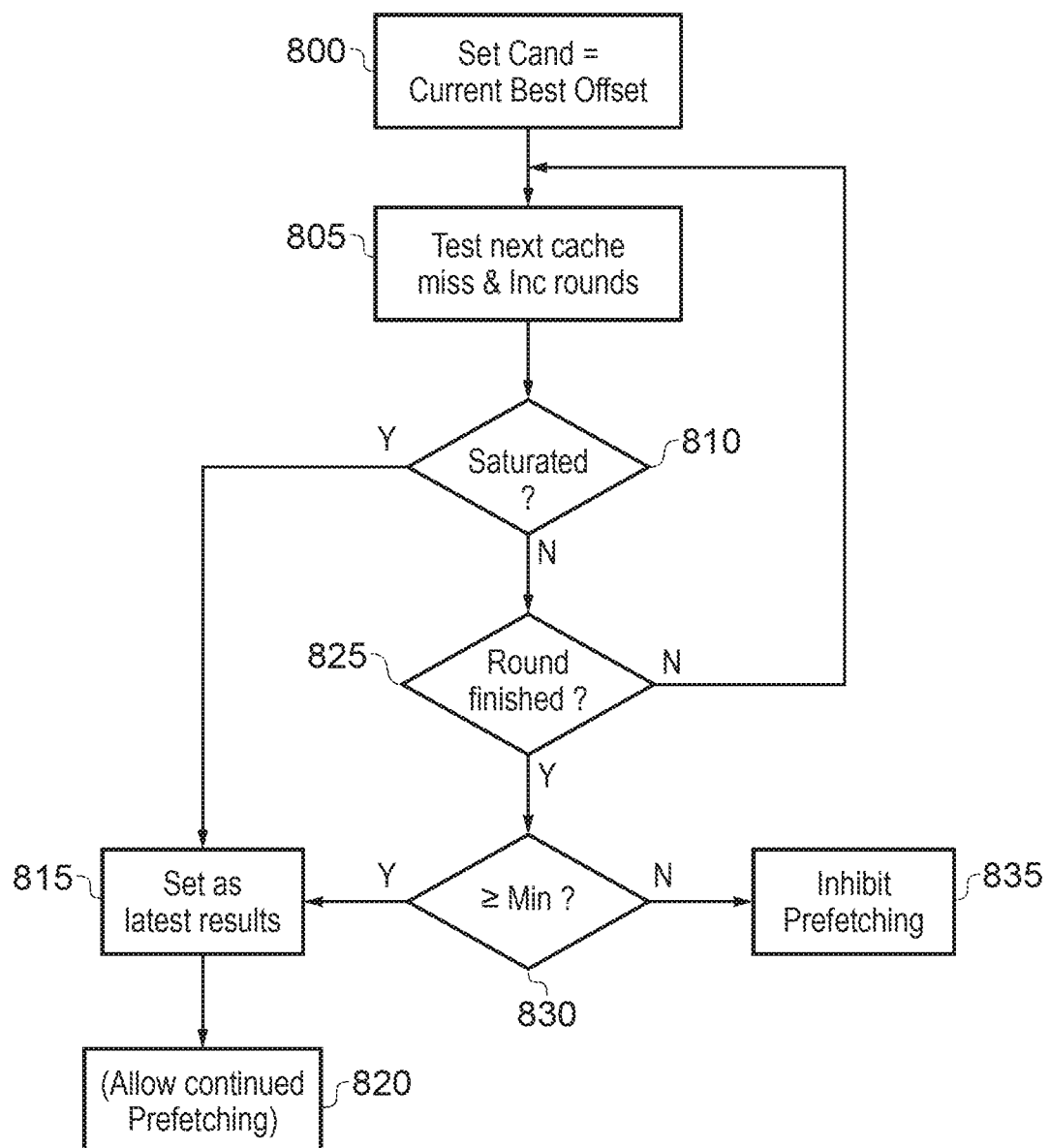
FIGS. 8 to 10 are schematic flowcharts illustrating respective methods.

FIG. 8 is a schematic flowchart relating to an example of the verification process. The ongoing phase or indeed sub-phase can be paused to allow this verification process to take place, or the verification process can be performed between successive sub-phases.

At a step 800, the current best offset value is set as the (only) candidate offset for testing.

A next cache miss or access to a previously prefetched data element is tested at a step 805 and a score established depending on whether there is a hit in the RRT. The variable rounds is also incremented.

At a step 810, the score is checked to see whether it is saturated in the manner discussed above. If so, then control passes to a step 815 at which the score and rounds metric are set as the latest results for the current best offset. In this way, at any time, the one or more metrics previously detected for a current offset value comprise the one or more metrics most recently detected for the current offset value.

At a step 820, prefetching is allowed to continue using the current best offset. In other words, the current best offset has passed the verification.

Returning to the step 810, if the score is not saturated then control passes to a step 825 at which a detection is made as to whether the round has finished. If the answer is no then control returns to the step 805. If the answer is yes then control passes to a step 830 at which a detection is made as to whether the score is greater to or equal to the minimum threshold (such as 20). If yes then control passes to the step 815 discussed above, but if is no then control passes to a step 835 at which prefetching is inhibited until a next instance of a next current best offset is established.

The verification method of FIG. 8 is carried out, for example, by the prefetch engine 152, which therefore provides an example of verification circuitry to detect, at one or more predetermined stages (such as the stages 720, 725, 735 and/or the stages 750, 755, 760) with respect to the processing of the group of candidate offset values by the offset value selection circuitry, one or more verification metrics (such as score, rounds) representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and control circuitry 340 to inhibit prefetching at least until a next selection of a current offset value by the offset value selection circuitry, in response to a detection by the verification circuitry that the one or more verification metrics do not comply with the predetermined condition. For example, as discussed above, the predetermined condition may be such that the one or more verification metrics represent at least a minimum threshold proportion of the set of data element accesses.

The techniques discussed above will be summarised with reference to FIGS. 9 and 10.

Figure 9:
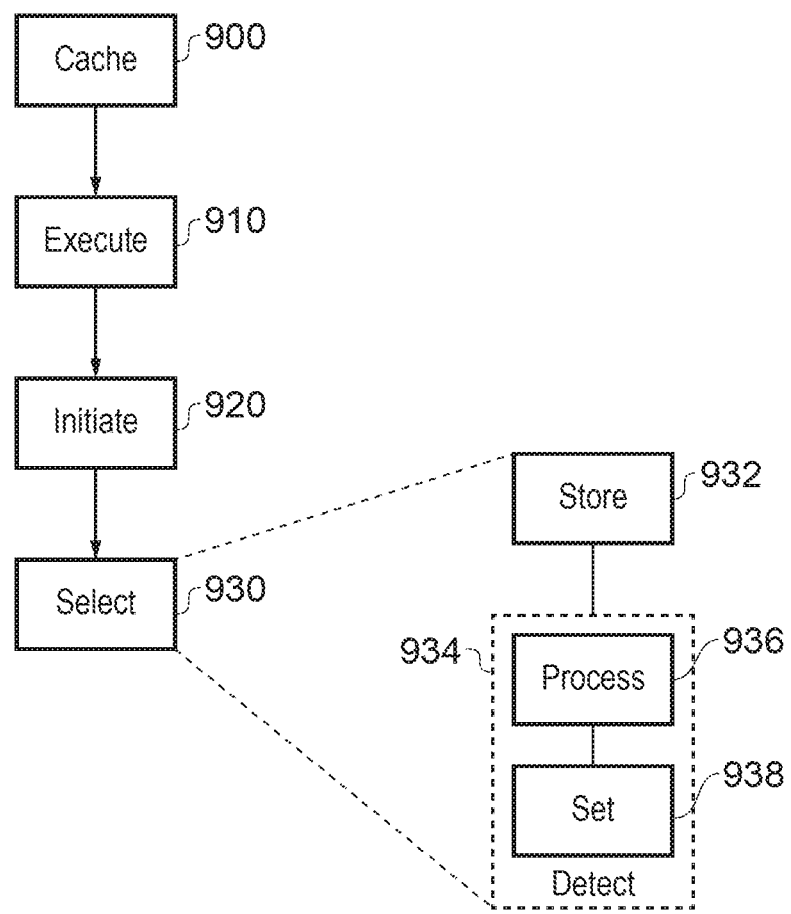

FIG. 9 is a schematic flowchart illustrating a method comprising:

caching (at a step 900), by a cache memory, a subset of data elements from a main memory;

executing (at a step 910) program code to access data elements having respective memory addresses, comprising accessing the data elements in the cache memory and, in the case of a cache miss, fetching the data elements from the main memory;

initiating (at a step 920), in response to an access to a current data element, prefetching into the cache memory of a data element at a memory address defined by a current offset value relative to the address of the current data element; and selecting (at a step 930) the offset value, the selecting step 930 comprising:

storing (at a step 932) memory addresses in an address table, for which a data element accessed by the processing element resulted in a cache miss or an access to a previously prefetched data element; and detecting (at a step 934), for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table;

in which the detecting step comprises processing (at a step 936) the group of candidate offset values as successive complementary sub-groups of one or more of the group of candidate offset values and setting (at a step 938) a next instance of the current offset value in response to processing each sub-group, in dependence upon the proportions indicated by the one or more detected metrics for that sub-group; and the one or more metrics previously detected for the current offset value.

Figure 10:
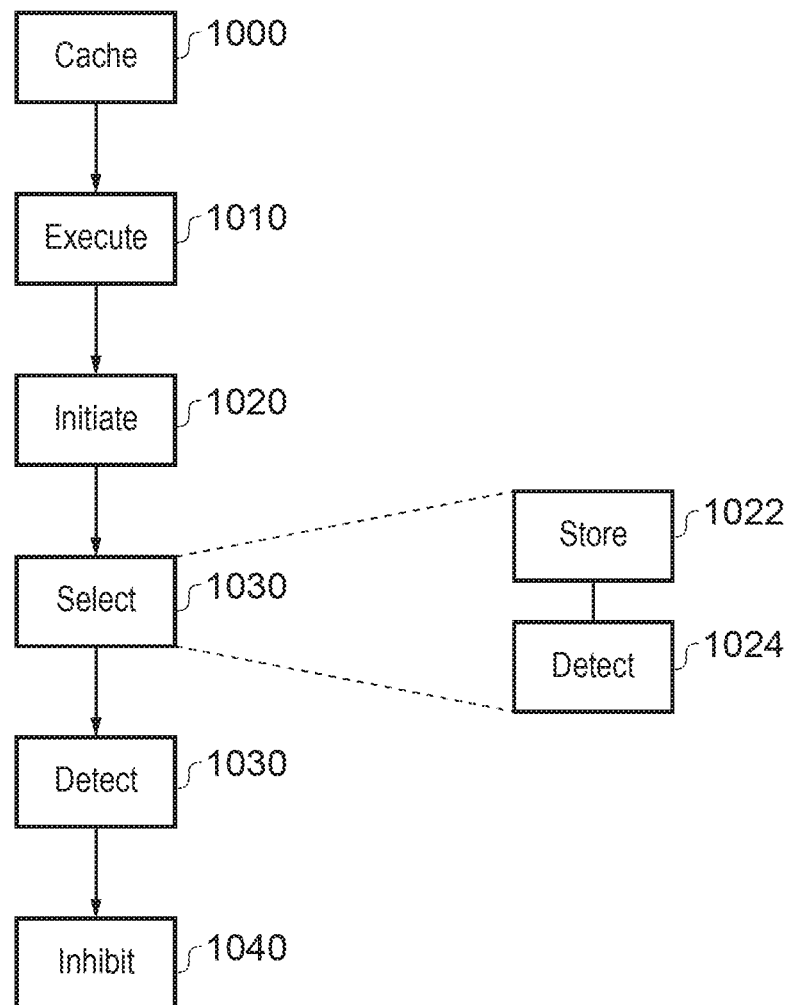

FIG. 10 is a schematic flowchart illustrating a method comprising:

caching (at a step 1000) a subset of data elements from a main memory in a cache memory;

executing (at a step 1010) program code to access data elements having respective memory addresses, comprising accessing the data elements in the cache memory and, in the case of a cache miss, fetching the data elements from the main memory;

initiating (at a step 1020), in response to an access to a current data element, prefetching into the cache memory of a data element at a memory address defined by a current offset value relative to the address of the current data element;

selecting (at a step 1030) an offset value, the selecting step 1030 comprising:

storing (at a step 1022) in an address table memory addresses for which a data element accessed by the processing element resulted in a cache miss or an access to a previously prefetched data element;

detecting (at a step 1024), for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table;

in which the detecting step comprising setting a next instance of the current offset value in response to the one or more detected metrics;

detecting (at a step 1030), at one or more predetermined stages with respect to the processing of the group of candidate offset values by the offset value selection circuitry, one or more verification metrics representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and inhibiting (at a step 1040) prefetching at least until a next selection of a current offset value by the offset value selection circuitry, in response to a detection by the verification circuitry that the one or more verification metrics do not comply with the predetermined condition.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing circuitry comprising:

a cache memory to cache a subset of data elements from a main memory;

a processing element to execute program code to access data elements having respective memory addresses, the processing element being configured to access the data elements in the cache memory and, in the case of a cache miss, to fetch the data elements from the main memory;

prefetch circuitry, responsive to an access to a current data element, to initiate prefetching into the cache memory of a data element at a memory address defined by a current offset value relative to the address of the current data element;

offset value selection circuitry comprising:

an address table to store memory addresses for which a data element accessed by the processing element resulted in a cache miss or an access to a previously prefetched data element;

detector circuitry to detect, for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table;

in which the detector circuitry is configured to set a next instance of the offset value in response to the one or more detected metrics;

verification circuitry to detect, for the current offset value while the prefetch circuitry initiates prefetching using the using the current offset value, at one or more predetermined stages with respect to the processing of the group of candidate offset values by the offset value selection circuitry to generate the next instance of the offset value, one or more verification metrics representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and control circuitry to inhibit prefetching at least until generation of the next instance of the offset value by the offset value selection circuitry, in response to a detection by the verification circuitry that the one or more verification metrics do not comply with the predetermined condition.

2. Circuitry according to claim 1, in which the predetermined condition is such that the one or more verification metrics represent at least a minimum threshold proportion of the set of data element accesses.

3. Circuitry according to claim 1, in which the group of candidate offset values comprises one or more positive candidate offset values and one or more negative offset values.

4. Circuitry according to claim 1, in which the metric previously detected for the current offset value is a metric most recently detected for the current offset value.

5. Circuitry according to claim 1, in which the cache memory is arranged as a plurality of cache lines, and each data element represents a cache line.

6. Circuitry according to claim 1, in which the one or more respective metrics comprise:
   (i) a score metric indicating a number of data element accesses which resulted in a cache miss or an access to a previously prefetched data element, for which the memory address for that data element access differs by the candidate offset value from a memory address in the address table; and
   (ii) a rounds metric indicating a number of data element accesses in the set of data element accesses.

7. Circuitry according to claim 6, in which the detector circuitry is configured to detect the score metric for a candidate offset value in respect of successive data element accesses in the set of data element accesses until the score metric reaches a saturation threshold quantity or the rounds metric reaches a threshold set size.

8. Circuitry according to claim 1, in which the detector circuitry is configured to process the group of candidate offset values as successive complementary sub-groups of one or more of the group of candidate offset values and to set a next instance of the offset value in response to processing each sub-group, in dependence upon the proportions indicated by the one or more detected metrics for that sub-group; and the one or more metrics previously detected for the current offset value.

9. Circuitry according to claim 8, in which the detector circuitry is configured to set a next instance of the offset value according to which of:
   (i) the one or more detected metrics for that sub-group; and
   (ii) the one or more metrics as previously detected for the current offset value indicate a greatest proportion.

10. Circuitry according to claim 9, in which the one or more metrics previously detected for a current offset value comprise the one or more metrics most recently detected for the current offset value.

11. Circuitry according to claim 1, in which the group of candidate offset values comprises integer non-zero offset values between $-(2^n-1)$ and $2^n$ where n is an integer.

12. Circuitry according to claim 11, in which n=6.

13. Data processing circuitry comprising:
   means for caching a subset of data elements from a main memory in a cache memory;
   means for executing program code to access data elements having respective memory addresses, comprising accessing the data elements in the cache memory and, in the case of a cache miss, fetching the data elements from the main memory;
   means for initiating, in response to an access to a current data element, prefetching into the cache memory of a data element at a memory address defined by a current offset value relative to the address of the current data element;
   means for selecting an offset value, the selecting means comprising:
   means for storing in an address table memory addresses for which a data element accessed by the processing element resulted in a cache miss or an access to a previously prefetched data element;
   means for detecting, for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table;
   in which the detecting means comprises setting a next instance of the offset value in response to the one or more detected metrics;
   means for detecting, for the current offset value while the initiating means initiates prefetching using the using the current offset value at one or more predetermined stages with respect to the processing of the group of candidate offset values by the selecting means to generate the next instance of the offset value, one or more verification metrics representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and
   means for inhibiting prefetching at least until generation of the next instance of the offset value by the selecting means, in response to a detection by the detecting means that the one or more verification metrics do not comply with the predetermined condition.

14. A method comprising:
   caching a subset of data elements from a main memory in a cache memory;
   executing program code to access data elements having respective memory addresses, comprising accessing the data elements in the cache memory and, in the case of a cache miss, fetching the data elements from the main memory;
   initiating, in response to an access to a current data element, prefetching into the cache memory of a data element at a memory address defined by a current offset value relative to the address of the current data element;
   selecting an offset value, the selecting step comprising:
   storing in an address table memory addresses for which a data element accessed by the processing element resulted in a cache miss or an access to a previously prefetched data element;
   detecting, for each of a group of candidate offset values, one or more respective metrics representing a proportion of a set of data element accesses which resulted in a cache miss or an access to a previously prefetched data element, for which the memory address for that data element access differs by the candidate offset value from a memory address in the address table;

in which the detecting step comprising setting a next instance of the offset value in response to the one or more detected metrics;

detecting, for the current offset value while the initiating step initiates prefetching using the using the current offset value at one or more predetermined stages with respect to the processing of the group of candidate offset values by the selecting step to generate the next instance of the offset value, one or more verification metrics representing a proportion of a set of data element accesses which resulted in a cache miss or an access to a previously prefetched data element, for which the memory address for that data element access differs by the current offset value from a memory address in the address table, to detect whether the one or more verification metrics comply with a predetermined condition; and inhibiting prefetching at least until generation of the next instance of the offset value by the selecting step, in response to a detection that the one or more verification metrics do not comply with the predetermined condition.

* * * * *